United States Patent
Yamamoto et al.

(10) Patent No.: US 8,000,965 B2
(45) Date of Patent: Aug. 16, 2011

(54) INFORMATION-PROCESSING DEVICE AND METHOD THAT ATTAINS SPEECH-RECOGNITION TO RECOGNIZE DATA INPUT VIA SPEECH

(75) Inventors: Hiroki Yamamoto, Yokohama (JP); Hideo Kuboyama, Yokohama (JP); Toshiaki Fukada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 12/033,574

(22) Filed: Feb. 19, 2008

(65) Prior Publication Data

US 2008/0201151 A1 Aug. 21, 2008

(30) Foreign Application Priority Data

Feb. 20, 2007 (JP) ................................ 2007-039339

(51) Int. Cl.
*G10L 15/00* (2006.01)
*G10L 15/18* (2006.01)
(52) U.S. Cl. ...... 704/257; 704/255; 704/270; 704/270.1
(58) Field of Classification Search .................. 704/277, 704/255, 257, 270, 270.1
See application file for complete search history.

(56) References Cited

U.S. PATENT DOCUMENTS

| | | | | |
|---|---|---|---|---|
| 5,890,123 | A * | 3/1999 | Brown et al. | 704/270.1 |
| 7,024,361 | B2 * | 4/2006 | Kosaka et al. | 704/257 |
| 7,827,033 | B2 * | 11/2010 | Ativanichayaphong et al. | 704/255 |
| 2003/0236673 | A1 * | 12/2003 | Nakagawa et al. | 704/277 |

FOREIGN PATENT DOCUMENTS

| | | |
|---|---|---|
| JP | 2000-181488 A | 6/2000 |
| JP | 2004-021920 A | 1/2004 |
| JP | 2005-283797 A | 10/2005 |

\* cited by examiner

*Primary Examiner* — Vincent P Harper
(74) *Attorney, Agent, or Firm* — Canon U.S.A., Inc. I.P. Division (57) ABSTRACT

An information-processing device and method that attains speech-recognition to recognize data input via speech. The information-processing device and method includes analyzing speech-recognition-grammar data, generating data on a template used to input data by speech based on the analysis results, and displaying the generated speech-input-template data.

9 Claims, 10 Drawing Sheets

| | | END NODE | | | | | |
|---|---|---|---|---|---|---|---|
| | | N1 | N2 | N3 | N4 | N5 | N6 |
| START NODE | N1 | | 2 | | | | |
| | N2 | | | 5 | | | |
| | N3 | | | | 1 | | |
| | N4 | | | | | 5 | |
| | N5 | | | | | | 1 |
| | N6 | | | | | | |

INFORMATION-PROCESSING DEVICE AND METHOD THAT ATTAINS SPEECH-RECOGNITION TO RECOGNIZE DATA INPUT VIA SPEECH

BACKGROUND OF THE INVENTION

1. Field of the Invention

The present invention relates to an information-processing device configured to attain speech recognition to recognize data input by speech.

2. Description of the Related Art

Speech-recognition technologies have become commercially practical as technologies of achieving data input and/or device operations through speech input in place of key input and/or button operations. According to many speech-recognition technologies that are currently used, only predetermined words and/or phrases can be recognized, even though the number of words varies depending on the technology. Therefore, it is difficult for a user to know what kind of words and/or phrases can be accepted at the time when the user performs speech input. Accordingly, there have been proposed speech-recognition systems capable of presenting data on words and/or phrases that can be input by speech to the user to perform the speech input smoothly.

For example, Japanese Patent Laid-Open No. 2000-181488 discloses a speech-recognition device presenting a specific input example such as "Input data such as Showa-machi, Kariya city, Aichi prefecture" at the time when address data is input by speech. Further, a speech-recognition device disclosed in Japanese Patent Laid-Open No. 2005-283797 is configured to present input-template data to the user, where the data is used to correct speech-input data on continuous numbers when the speech-input data is erroneously recognized. For example, the input-template data reads "2 for the 7th" to correct the speech-input data on the continuous numbers.

Of systems using a graphical user interface (GUI) and the speech input in combination, many systems construct the GUI to show the user what kind of data should be input. For example, a data-input device disclosed in Japanese Patent Laid-Open No. 2004-021920 displays template data which reads "from ________ to ________" (where the part corresponding to "________" denotes an input field) in a screen image used to input route data to inform the user that data on uttered words "from Tokyo to Osaka" can be input, for example.

According to the above-described data-input device, fixed expressions are displayed as text data and a part where two or more words should be shown is indicated by the input field. Therefore, it becomes possible to discriminate between a changeable part and a part where predetermined data should be input. Further, example word data that can be input to the input field is presented to the user through guidance using synthesized speech and/or a display through predetermined operations so that a user interface (UI) which specifically shows an acceptable input is achieved. Thus, since example data input by speech and the input-template data are displayed to the user, the user can utter words without hesitation.

According to the speech-recognition device disclosed in Japanese Patent Laid-Open No. 2000-181488, the example input data presented to the user is determined in advance. According to the example input data presented by the speech-recognition device disclosed in Japanese Patent Laid-Open No. 2005-283797, the user can easily understand which part of the example input data is changeable. However, the method of generating the above-described example input data is not disclosed in Japanese Patent Laid-Open No. 2005-283797. According to the data-input device disclosed in Japanese Patent Laid-Open No. 2004-021920, the method of determining example data that can be input to the input field in advance, and the method of generating the example input data by extracting the word data corresponding to each of the input fields on the basis of the grammar data corresponding to each of the input fields are disclosed. However, the input-template data presented to the user, the input-template data reading "from ________ to ________", is fixed at the time when the UI is described.

According to any one of the above-described documents, when a phrase which can be input is changed, the grammar data used to perform the speech recognition, the example input data, and the configuration of the GUI should be changed.

For example, according to the speech-recognition device disclosed in Japanese Patent Laid-Open No. 2000-181488, example input data for setting should be changed in advance to input data on the address number at the time where data on the address is input.

Further, according to the speech-recognition device disclosed in Japanese Patent Laid-Open No. 2004-021920, the description of the GUI should be changed to change the phrase corresponding to route data input by speech into a phrase to which "station" is added, such as the phrase "from station to ________ station".

Thus, according to known speech-recognition systems, since example input data and/or a UI presented to the user is determined in advance, the UI should be changed, to change phrase data which can be input by speech.

SUMMARY OF THE INVENTION

Accordingly, the present invention provides an information-processing device configured to change a UI presented to a user according to a change in grammar data.

An information-processing device according to one aspect of the present invention includes an analysis unit configured to analyze speech-recognition-grammar data, a generation unit configured to generate data on a template used to input speech data based on a result of the analysis by the analysis unit, and a display-control unit configured to display the speech-input-template data generated by the generation unit.

Further features of the present invention will become apparent from the following description of exemplary embodiments with reference to the attached drawings.

DESCRIPTION OF THE EMBODIMENTS

Hereinafter, embodiments of the present invention will be described in detail with reference to the attached drawings. However, each of components disclosed in the following embodiments is provided, as an example component, so that scope of the present invention is not limited to each of those components.

Hereinafter, a first embodiment of the present invention will be described in detail with reference to the attached drawings. The first embodiment describes an example where the present invention is used to input data on a search condition in an information-processing device configured to search for a TV program. The search-condition data for inputting is data on performers and the category of TV programs including "news", "movie", etc.

Figure 2:
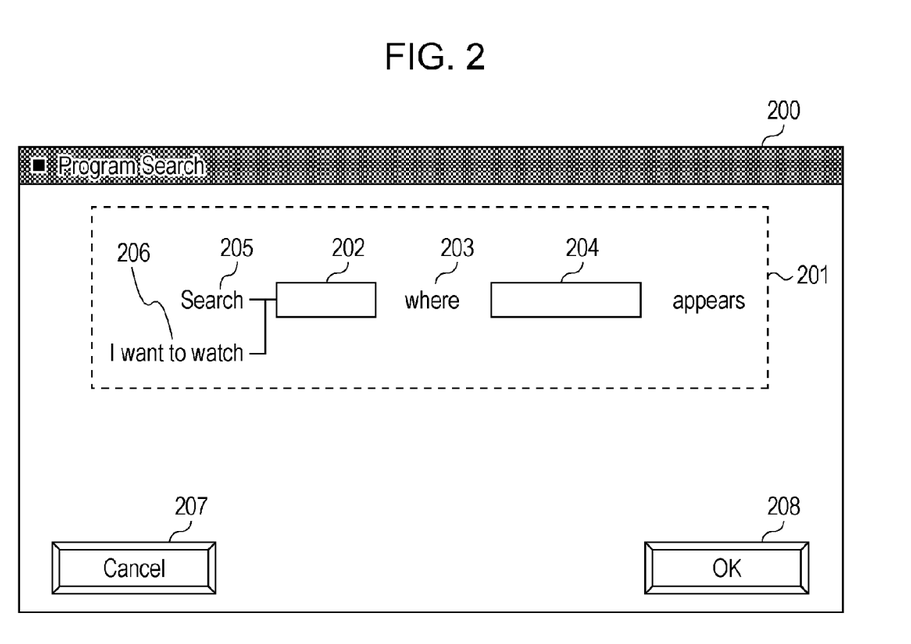
FIG. 2 shows an example UI displayed by an information-processing device according to a first embodiment of the present invention.

First, a brief explanation of operations of the information-processing device will be provided. If a user instructs the information-processing device to search for a TV program through a predetermined operation, the information-processing device displays the image of a user interface (UI) shown in FIG. 2. In FIG. 2, a UI 200 is shown as an example UI used to input the search-condition data.

Input-template data 201 is provided to input the search-condition data by speech. Here, the input-template data 201 shows example input data accepted by a speech-recognition mechanism. Blank fields may be provided in the input-template data 201. According to the present embodiment, blank input fields 202 and 204 are provided to indicate that data on two or more words can be input to each of the input fields 202 and 204. Data on the TV-program categories such as "sports", "news", etc., and data on performers of the TV program can be input to each of the input fields 202 and 204.

Signs 205 and 206 indicate two types of words that appear at the head of a sentence. Namely, the signs 205 and 206 indicate that two sentences "Search . . . ." and "I want to watch . . . ." can be input by speech. Thus, the information-processing device exhibits what kind of input data can be accepted through the input-template data 201 to the user. According to the present embodiment the input-template data is not generated in advance, but generated automatically by the information-processing device based on speech-recognition-grammar data used to perform speech input. Hereinafter, the operations of the information-processing device will be described in detail.

Figure 1:
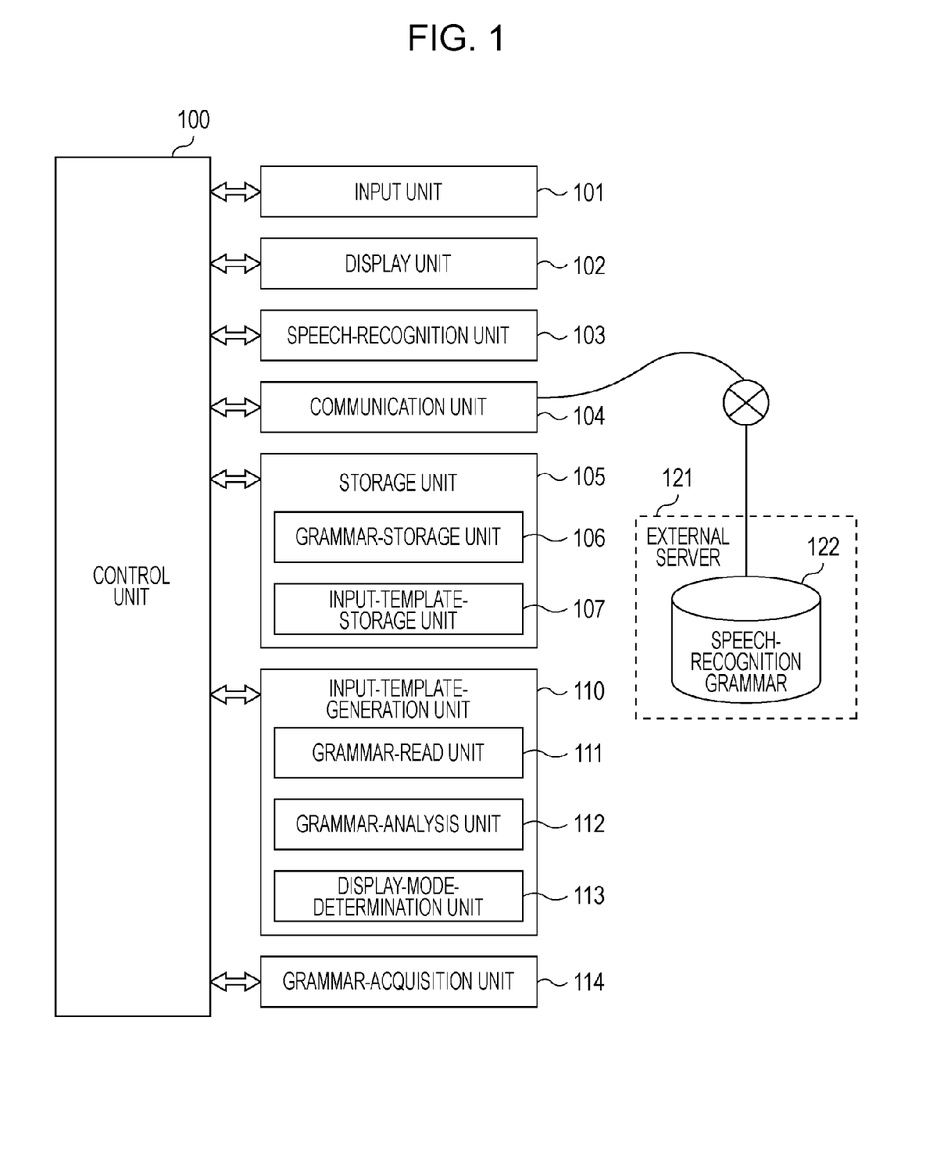
FIG. 1 shows the basic configuration of an information-processing device according to an embodiment of the present invention.

FIG. 1 shows the basic configuration of the information-processing device according to the present embodiment. The information-processing device includes a control unit 100, an input unit 101, a display unit 102, a speech-recognition unit 103, a communication unit 104, a storage unit 105, a grammar-storage unit 106, an input-template-storage unit 107, an input-template-generation unit 110, a grammar-read unit 111, a grammar-analysis unit 112, a display-mode-determination unit 113, and a grammar-acquisition unit 114.

The control unit 100 includes a work memory, a central-processing unit (CPU), a micro-processing unit (MPU), etc., reads a program and/or data stored in the storage unit 105, and performs various types of processing. The input unit 101 includes an input device including a group of buttons, a keyboard, a mouse, a touch panel, a pen, a tablet, a digitizer, etc., a microphone used to input data by speech, and an input device such as an analog-to-digital (A/D) converter. The input unit 101 functions as an input interface configured to input data on various instructions to the information-processing device. The display unit 102 includes a display device such as a liquid-crystal display, and displays various types of information including image data, text data, etc. Here, the display unit 102 may be provided as a touchpanel-display device. In that case, the display unit 102 is provided with the function of the input unit 101 to input data on the various types of instructions to the information-processing device.

The speech-recognition unit 103 recognizes speech data transmitted from the input unit 101 according to speech-recognition grammar data stored in the grammar-storage unit 106, and displays the recognition result on the display unit 102. A known technology may be used for achieving the above-described speech recognition. The communication unit 104 includes a device configured to receive a broadcast wave and/or a device used to connect to a local-area network (LAN) and/or the Internet. The communication unit 104 is used to communicate with an external device and/or an apparatus when acquiring speech-recognition-grammar data 122 from an external server 121 by using the grammar-acquisition unit 114 provided in the subsequent stage.

The storage unit 105 includes a hard-disk drive (HDD) used to store various types of information, a storage medium including a compact disk (CD)-read-only memory (ROM), a digital-versatile disk (DVD)-ROM, etc. used to transmit various types of information to the information-processing device, and so forth. Further, various types of application programs, a user-interface-control program, various types of data required to execute the programs, etc. are stored in the HDD and/or the storage medium. The above-described programs and data are read by the information-processing device under the control of the control unit 100.

The grammar-storage unit 106 is an area used to store the speech-recognition-grammar data describing grammar rules on which data can be received by the speech-recognition unit 103. The input-template-storage unit 107 is an area used to store information about the input template displayed on the display unit 102. The input-template-generation unit 110 includes the grammar-read unit 111, the grammar-analysis unit 112, and the display-mode-determination unit 113, and generates the input-template data on the basis of the speech-recognition-grammar data. The grammar-read unit 111 reads the speech-recognition grammar on which data is stored in the grammar-storage unit 106.

The grammar-analysis unit 112 analyzes the structure of the speech-recognition grammar on which data is read by the grammar-read unit 111. The display-mode-determination unit 113 determines the mode in which the input-template data is displayed on the basis of the result of the analysis made by the grammar-analysis unit 112. The grammar-acquisition unit 114 acquires the speech-recognition-grammar data 122 transmitted from the external server 121 via the communication unit 104.

Figure 3:
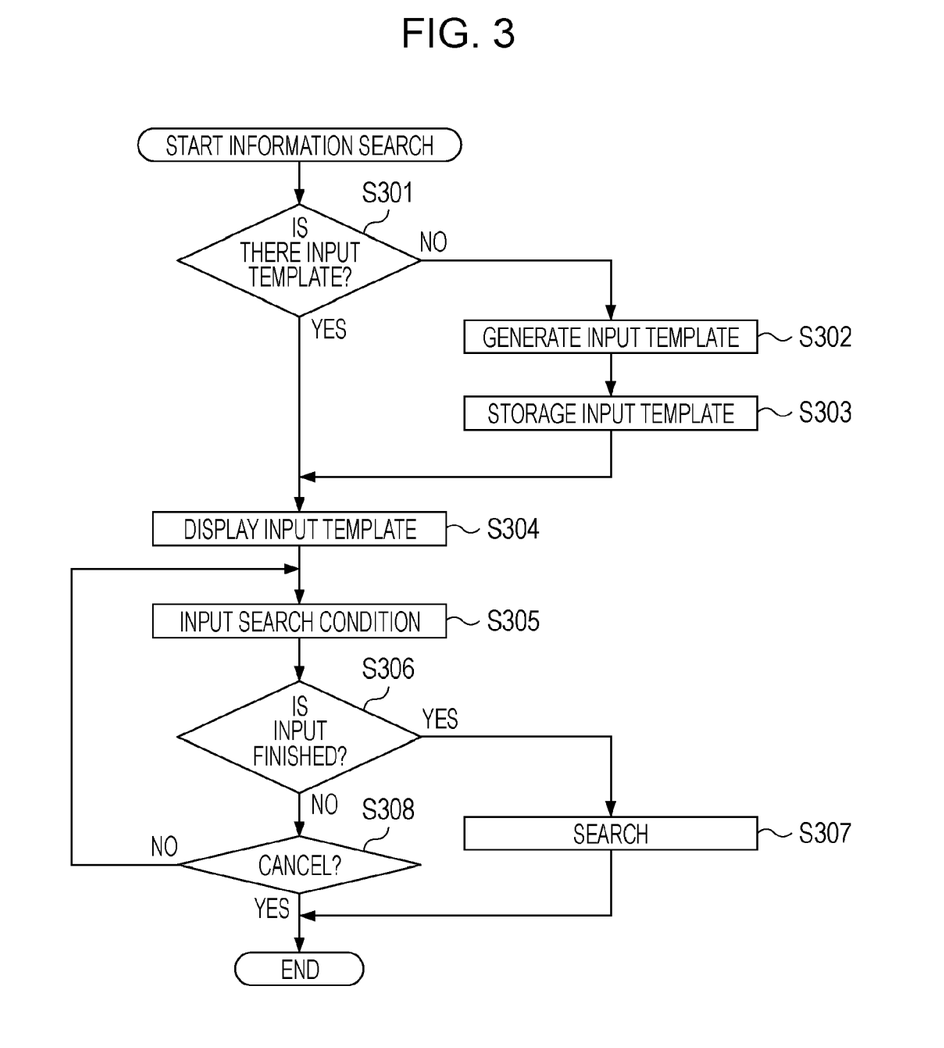
FIG. 3 is a flowchart illustrating processing performed by the information-processing device according to the first embodiment.

Now, the flow of processing performed by the information-processing device to search for information will be described. FIG. 3 is a flowchart illustrating the information-search processing performed by the information-processing device. Data on a program provided to achieve the processing illustrated in the flowchart is stored in the storage unit 105, and the program is executed under the control of the control unit 100.

When the user performs an operation to start making the information search, the processing is performed according to the flowchart of FIG. 3. First, in step S301, the control unit 100 confirms whether the input-template data corresponding to the speech-recognition grammar is stored in the input-template-storage unit 107. If the input-template data corresponding to the speech-recognition grammar is stored in the input-template-storage unit 107 (Yes at step S301), the processing advances to step S304.

If the input-template data corresponding to the speech-recognition grammar is not stored in the input-template-storage unit 107, (No at step S301), then in step S302, the input-template-generation unit 110 generates the input-template data. Next, in step S303, the generated input-template data is stored in the input-template-storage unit 107, and the processing advances to step S304. Details on the method of generating the input-template data are described below.

At step S304, the control unit 100 reads the input-template data corresponding to the speech-recognition grammar used to make the information search from the input-template-storage unit 107, and performs control so that a UI including the input-template data is displayed on the display unit 102. The displayed UI is shown in FIG. 2, for example.

FIG. 2 shows a UI 200 displayed when the information-processing device starts making the information search. According to the present embodiment, the input-template data 201, a cancel button 207, and an OK button 208 are displayed by using a graphical user interface (GUI). Each of the input fields 202 and 204 is a GUI component used to receive transmitted text data. The user can input text data into each of the input fields 202 and 204 through the keyboard, etc. of the input unit 101. Each of a sign 203 and the signs 205 and 206 denotes a GUI component used to display text data.

Hereinafter, the GUI component into which the user can input text data is referred to as a text box, and a GUI component used to display fixed text data which is difficult for the user to change is referred to as fixed-text data.

Next, in step S305, data on the search condition is input to each of the text boxes 202 and 204. The user may input the search-condition data to the text boxes by using the keyboard of the input unit 101, or input the search-condition data to the text boxes by speech through the microphone of the input unit 101. When the control unit 100 detects the search-condition data input by speech, the speech-recognition unit 103 recognizes the speech data input by the user by using the speech-recognition-grammar data stored in the grammar-storage unit 106.

When data on the words corresponding to the speech data is recognized in the text boxes 202 and 204, data on the recognition result is displayed in the corresponding text box. In the present embodiment, a search for a program is not made until the search-condition data is input in each of the text boxes 202 and 204. That is to say, the OK button 208 is not selected until the search-condition data is input to each of the text boxes 202 and 204.

When the user finishes inputting the search-condition data and selects the OK button 208 (Yes at step S306), a search is made according to the input search-condition data, and data on the search result is displayed on the display unit 102. The control unit 100 conducts the information search. Namely, the control unit 100 searches in step S307 for information matching the search-condition data input from a database (not shown) stored in the storage unit 105.

When either data on the search result is displayed (step S307) or when the user stops the information search by selecting the cancel button 207 (No at step S306 and Yes at step S308), the information-search processing is terminated.

Next, the processing performed at step S302 by the input-template-generation unit 110 to generate the input-template data will be described. In the information-processing device according to the present embodiment, the input-template data is generated based on the speech-recognition grammar used to input data by speech.

Figure 4:
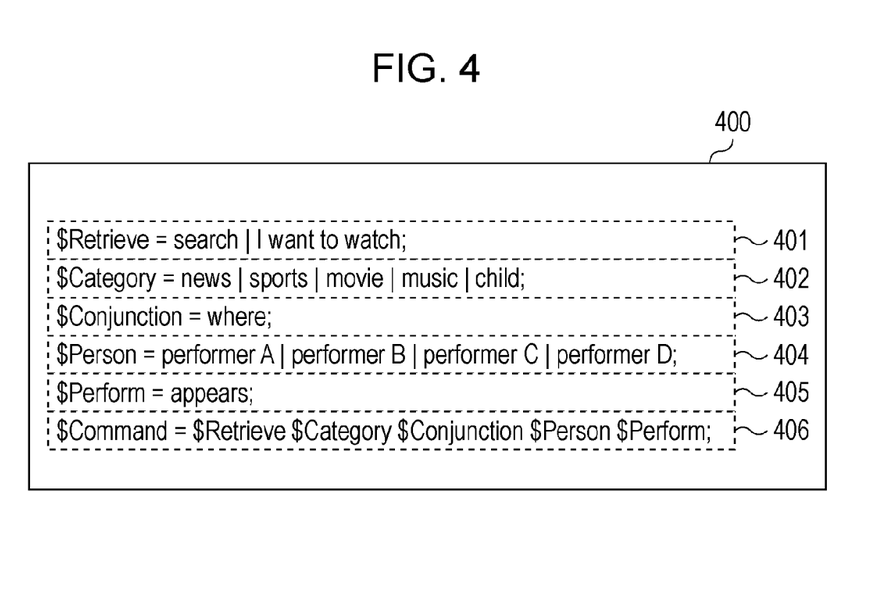
FIG. 4 shows an example speech-recognition grammar on which data is processed by an information-processing device according to first, second, and fourth embodiments of the present invention.

FIG. 4 shows an example of speech-recognition grammar data. The speech-recognition-grammar data 400 shown in FIG. 4 is used to input data for searching for a TV program by speech. The speech-recognition-grammar data 400 is written in a form similar to known Backus-Naur form (BNF). The form of the speech-recognition grammar illustrated in FIG. 4 is as follows:

The grammar rule is written at "rule name=right side;".

Only the name of a rule for definition is written on the left side.

The rule name is started with "$".

The definition of the rule is finished with ";".

A defined rule can be written on the right side.

"|" means OR.

A part bracketed by "[ ]" can be omitted.

A rule defined by "$Command" is received by the speech-recognition unit 103.

Regions 401, 402, 403, 404, 405, and 406 shown in the speech-recognition-grammar data 400 will be described based on the above-described rules.

The rule "$Retrieve" is defined in the region 401. The rule "$Retrieve" defines that either "Search" or "I want to watch" is used.

Likewise, the rules "$Category", "$Conjunction", "$person", and "$Perform" are defined in the regions 402 to 405. Grammar-rule data accepted as the speech-recognition-grammar data 400 is defined in the region 406. Namely, when data is recognized by speech by using the speech-recognition-grammar data 400, it is defined that speech-input data "Search □ □ E where ○ ○ appears" and/or "I want to watch □ □ where ○ ○ appears" is accepted. Here, the sign □ □ denotes any one of words defined by the rule "$Category" and the sign ○ ○ denotes any one of words defined by the rule "$Person".

Figure 5:
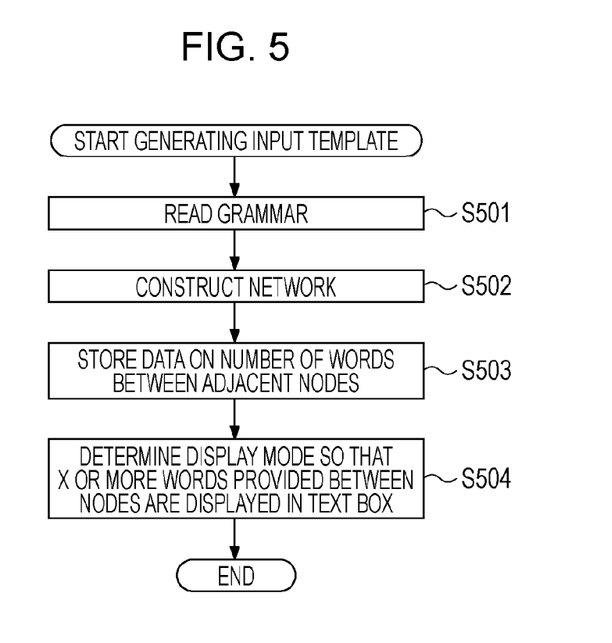
FIG. 5 is a flowchart illustrating input-template-generation processing performed by the information-processing device according to the first embodiment.

Next, processing performed to generate the input-template data based on the speech-recognition grammar will be described with reference to FIG. 5. First, in step S501, the grammar-read unit 111 reads the speech-recognition-grammar data stored in the grammar-storage unit 106. Next, in step S502, the grammar-analysis unit 112 analyzes the read speech-recognition-grammar data and constructs a network. The method used to construct the network by analyzing the grammar is well-known in the art, and thus, a detailed description is omitted herein.

Figure 6:
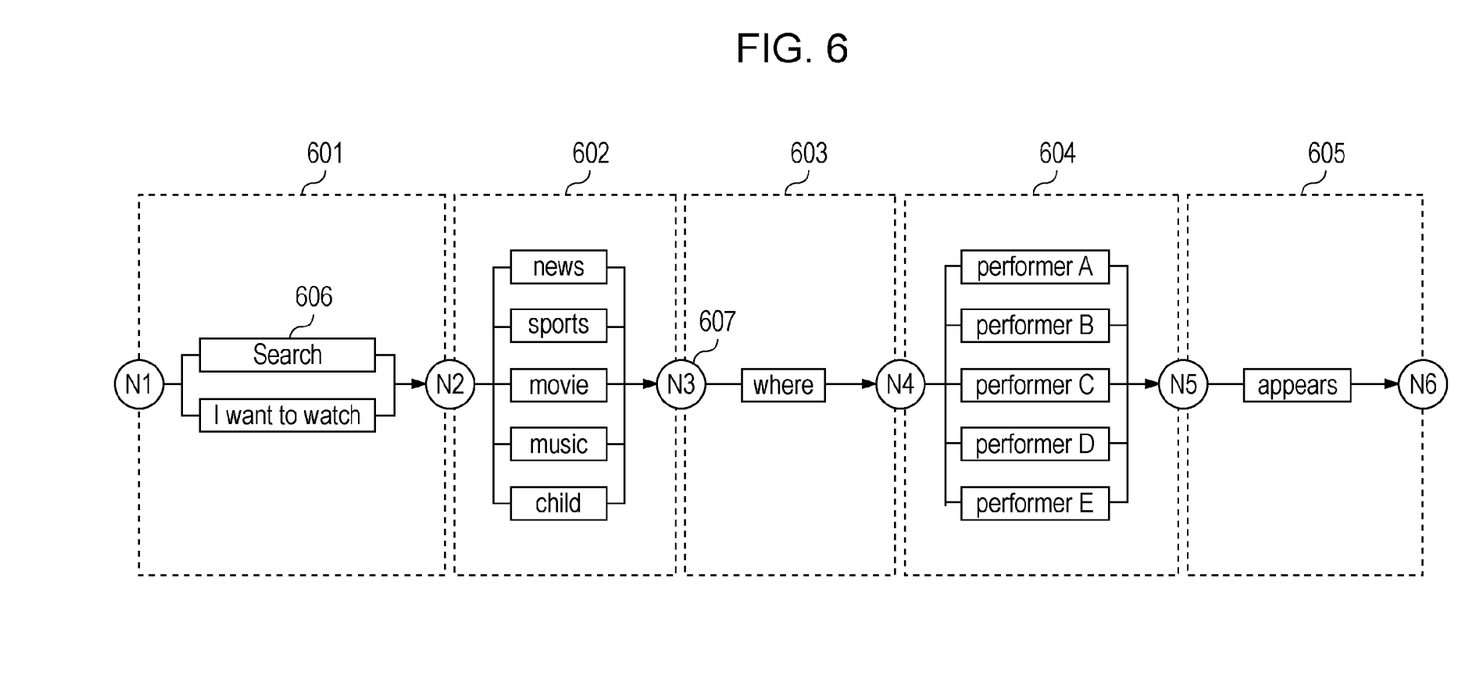
FIG. 6 shows an example network of the speech-recognition grammar on which data is processed by the information-processing device according to the first, second, and fourth embodiments.

FIG. 6 shows an example network constructed by analyzing the speech-recognition-grammar data 400. The network includes arcs and nodes. According to the present embodiment, each of the arcs denotes at least one word (as indicated by reference numeral 606, for example) and each of the nodes denotes the connection between the words (as indicated by reference numeral 607, for example).

Figure 7:
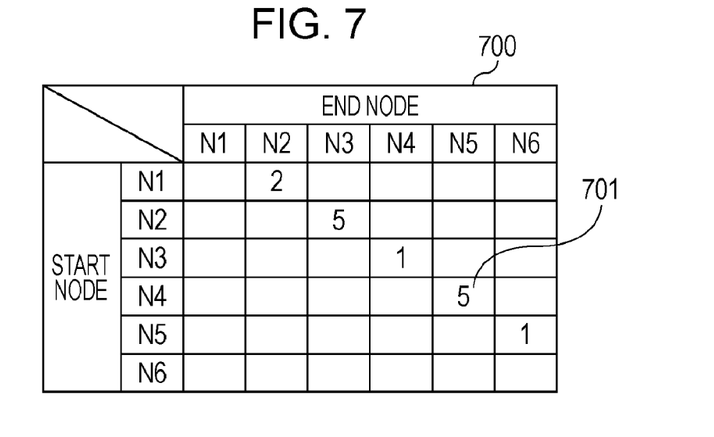
FIG. 7 shows example data temporarily stored during processing performed by the information-processing device according to the first embodiment.

Next, in step S503, the grammar-analysis unit 112 temporarily stores data on the number of words shown between adjacent nodes (=arc number) of the constructed network in the storage unit 105. FIG. 7 shows example data stored in the storage unit 105. In Table 700, the reference numerals of start nodes are shown along the vertical axis and the reference numerals of end nodes are shown along the horizontal axis. Further, the number of words shown between the start node and the end node is shown in the field corresponding to the intersection of the vertical axis and the horizontal axis. For example, reference numeral 701 denotes the number of words shown between a node N4 and a node N5. Thus, the number of words shown in each section sharing the previous connection and the subsequent connection in the speech-recognition-grammar-data is calculated and data on the calculated word number is stored.

The display-mode-determination unit 113 determines the mode of displaying an input template for generation according to the number of words shown between the nodes. According to the present embodiment, the mode of displaying the words shown between the nodes is changed according to the number of the words shown between the nodes, where the word-number data is stored in the storage unit 105. That is, if the number of words shown between the nodes is greater than or equal to X, the X or more words are not shown individually, but shown at one time in the text box. The number X is a natural number greater than or equal to two. If the number of words shown between the nodes is less than X, every word is shown as fixed-text data in step S504.

An example where the expression X=3 holds will now be described. According to the present embodiment, each of the number of words shown between nodes N2 and N3 and the number of words shown between nodes N4 and N5 becomes three or more, as shown in Table 700. In FIG. 6, the number of words shown between the nodes becomes three or more in both regions 602 and 604. Therefore, the display mode is determined so that data shown in both regions 602 and 604 is shown in the text box, and data shown regions 601, 603, and 605 is displayed as fixed-text data.

If the display mode is determined in the above-described manner, the input-template data 201 shown in the UI 200 is generated, as shown in FIG. 2. Further, according to the present embodiment, as for a region where the number of words shown between the nodes is two or more and less than X, display mode is determined so that a branch is shown, as indicated by reference numeral 205.

According to the present embodiment, the speech-recognition-grammar data read by the grammar-read unit 111 is stored in the storage unit provided in the information-processing device. The present invention is not limited to this configuration, and can be achieved by the grammar-read unit 111 directly reading the speech-recognition-grammar data 122 presented by the external server 121.

According to the present embodiment, the input-template-data is generated at step S302 and the generated input-template data is stored at step S303 when the input template data is not stored in the input-template storage unit 107.

The processing corresponding to steps S302 and S303 can be performed when the user updates the existing speech-recognition-grammar data by acquiring the speech-recognition-grammar data from the external server 121 by using the grammar-acquisition unit 114 and/or acquires data on new speech-recognition-grammar.

Thus, according to the information-processing device of the present embodiment, the speech-recognition grammar used to input data by speech is analyzed, and the input-template data can be generated based on the analysis result. Namely, when the speech-recognition grammar is changed, the input-template data presented to the user is automatically changed. Subsequently, the UI can be updated by updating the speech-recognition-grammar data, which makes it easier to change the UI of the information-processing device having the speech-input function.

For example, in the case where data on the condition for making the TV-program search is input, as described in the present embodiment, the methods of making the TV-program search vary with users. Some users want to make the TV-program search based on the program name, and some users want to make the TV-program search based on the time and genre of the TV program. Therefore, various types of speech-recognition grammars are provided to respond to various user needs, whereby each user can select his/her favorite speech-recognition grammar. Thus, it becomes possible to present a UI that meets a particular user's needs.

Further, since users can change the speech-recognition grammar by themselves, the UI can be individually customized with increased flexibility. Therefore, a user can use the information-processing device of the present embodiment, where the information-processing device includes the speech-input function, with improved usability and convenience.

At step S504 described above, the value of X is fixed so that the expression X=3 holds and the display mode is determined so that when the number of words shown between the nodes is X or more, the part corresponding to the words is shown in the text box. If the size of a display area is sufficiently large, the largest possible number of words should be displayed in the input template so that the user can see as much example acceptable input data as possible.

A second embodiment of the present invention will now be described which illustrates the case where the value of X is dynamically changed according to the size of the display area when the input-template data is generated in an information-processing device having the same configuration as that of the information-processing device of the first embodiment.

Figure 8:
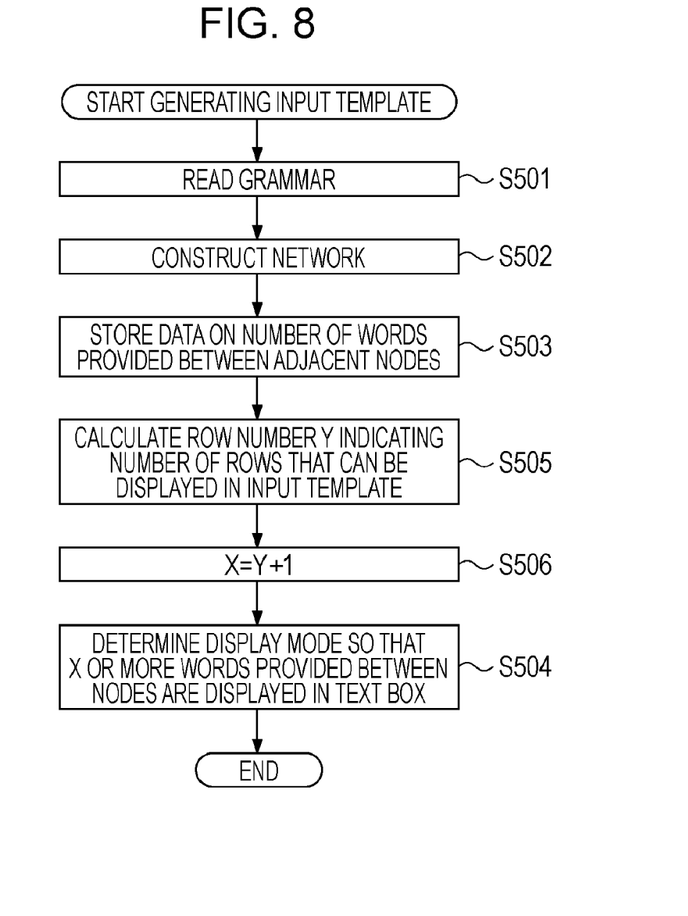
FIG. 8 is a flowchart illustrating input-template-generation processing performed by the information-processing device according to the second embodiment.

FIG. 8 shows the flowchart of processing performed to generate input-template data according to the second embodiment of the present invention. In FIG. 8, the same processing steps as those shown in the flowchart of FIG. 5 are designated by the same reference numerals. In FIG. 8, processing steps S505 and S506 are added between the processing steps S503 and S504 shown in FIG. 5.

At step S505, the display-mode-determination unit 113 calculates the number Y which is the number of rows that can be displayed in the image of the input-template data. The number Y can be calculated according to the following equation:

$$Y = INT\{((A-B)/C)/D\} \qquad \text{(Equation 1)}$$

In Equation 1, the meaning of each of variables is as shown below:

A: The height of the area of a UI displayed when data is input by speech.

B: The height of an area required to display UI components other than the input-template data.

C: The height of an area required to display a single row of the input-template data.

D: The number of speech-recognition grammars used at the same time.

Each of variables A, B, and C is determined by the dot number. Further, in Equation 1, the sign INT ( ) denotes a function that rounds down a fractional portion. According to Equation 1, the number Y is calculated, where the number Y is the maximum number of rows used to display the template image used to input data on a single speech-recognition grammar. Next, in step S506, the threshold value X of the number of words displayed in the text box is determined to be Y+1. Namely, when the search-condition data is shown, as fixed-text data, and when the number of rows used to display the search-condition data between nodes exceeds the maximum row number Y, the text-box-display mode is selected.

Figure 9:
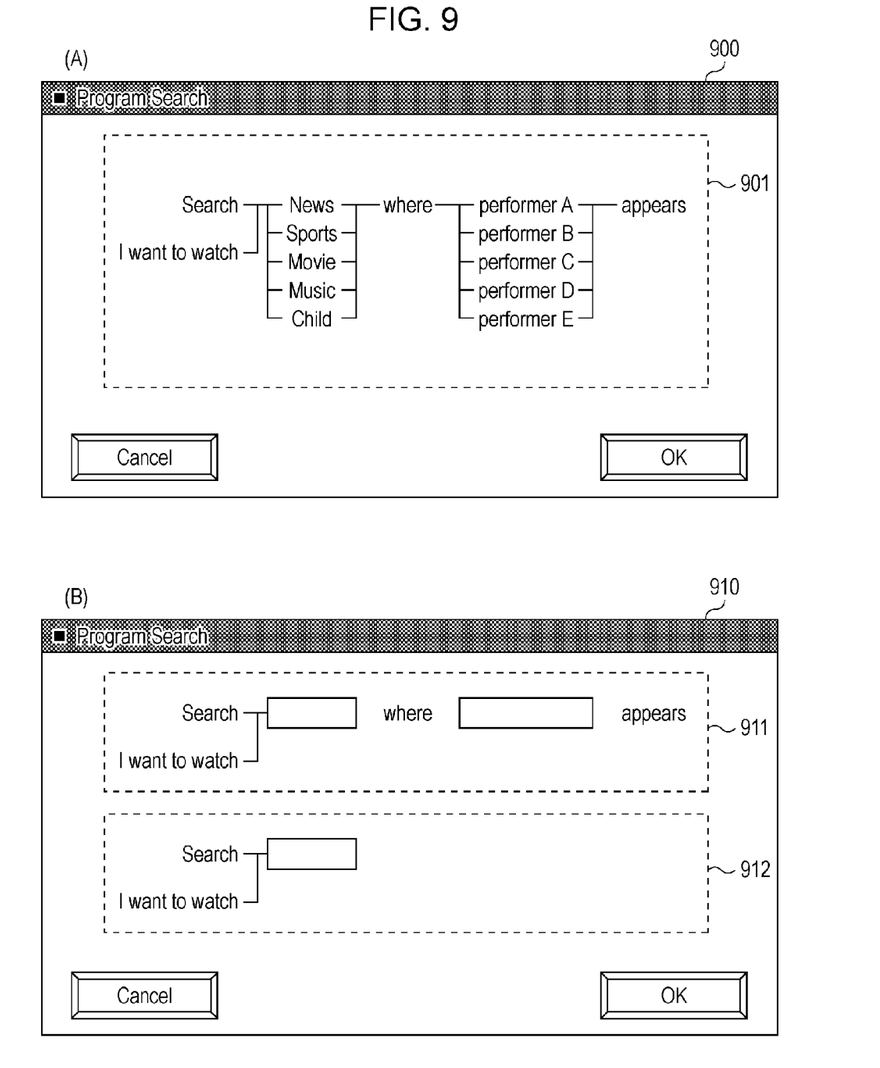
FIG. 9 shows example UIs displayed by the information-processing device according to the second embodiment.

FIG. 9 shows an example where the display mode is changed to another display mode according to whether a single speech-recognition grammar is used or two speech-recognition grammars are used. In part (A) of FIG. 9, a display image 900 shows a UI used to input search-condition data based on a single speech-recognition grammar. Since the area used to display the UI, which is designated by reference numeral 901, is sufficiently large, each of words accepted by the speech-recognition grammar is displayed as fixed-text data.

In part (B) of FIG. 9, a display image 910 shows a UI used to input the search-condition data by using a speech-recognition grammar accepting data input by speech, such as "I want to watch ○ ○" and "Search ○ ○" (where ○ ○ denotes a category) in addition to the speech-recognition grammar shown in part (A). Since the two speech-recognition grammars are used, each of areas 911 and 912 in which the input-template data can be displayed becomes smaller than the area 901 shown in the display image 900. In that case, part of word data is shown in text boxes.

Figure 10:
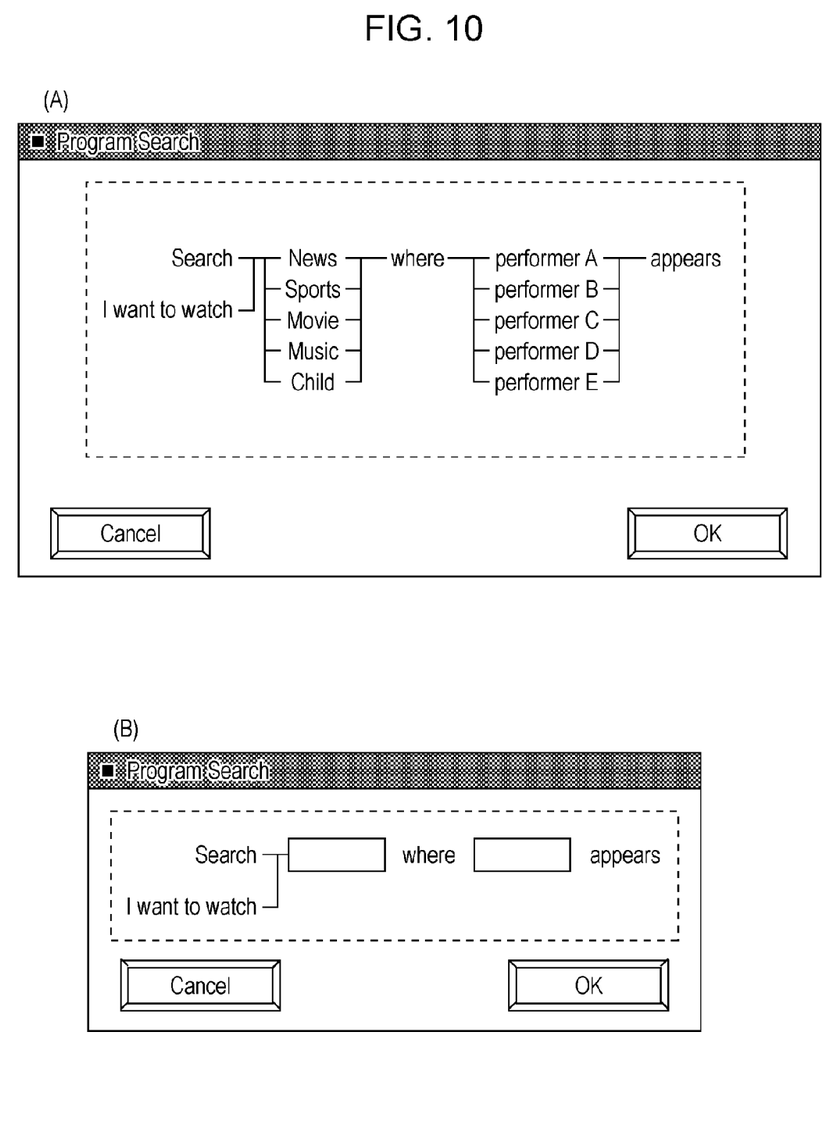
FIG. 10 also shows example UIs displayed by the information-processing device according to the second embodiment.

FIG. 10 shows an example where the mode of displaying input-template data is changed according to whether an information-processing device includes a display unit having a large display area as shown in part (A), or an information-processing device includes a display unit having a small display area as shown in part (B). As described above, according to the information-processing device of the present embodiment, data on an input template scalable based on the number of grammars for use and the size of the display area is generated.

According to certain speech-recognition grammar, a semantic tag is given to every word and/or grammar rule. Inherently, the semantic tag is given to data on an acquired recognition result to perform post-processing. In the second embodiment, the semantic tag is used to generate the input-template data.

An information-processing device according to a third embodiment of the present invention has the same configuration as that of the information-processing device of the first embodiment. However, the third embodiment is different from the first embodiment in that the semantic tag is given to each of the speech-recognition-grammar data stored in the grammar-storage unit 106 and the speech-recognition-grammar data acquired by the grammar-acquisition unit 114.

Figure 11:
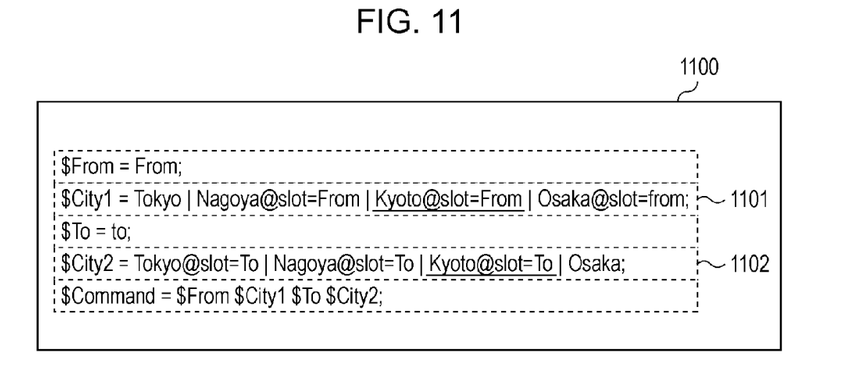
FIG. 11 shows an example speech-recognition grammar on which data is processed by an information-processing device according to a third embodiment of the present invention.

FIG. 11 shows example speech-recognition-grammar data provided with the semantic tags. Speech-recognition-grammar data 1100 shown in FIG. 11 is generated as speech-recognition grammar which accepts input data shown as "from ○ ○ to □ □", the input data being used to perform a railroad-route search, etc. The basic description format of the above-described speech-recognition grammar is similar to the Backus-Naur form. According to the present embodiment, the sign "@" is given to the word data and the semantic tag is written after the sign "v@".

According to the speech-recognition-grammar data 1100, the semantic tag is given to each of the word corresponding to a departure city name of a route defined in a region 1101 and the word corresponding to a destination city name defined in a region 1102. A semantic tag shown as "=From" is given to data on the departure city name, and a semantic tag shown as "slot=To" is given to data on the destination city name. Here, no semantic tag is given to each of data on the departure city name "Tokyo" and data on the destination city name "Osaka".

As described above, the semantic tag is inherently used to perform post-processing when the recognition result is obtained. For example, if the data "Tokyo@slot=From" is recognized, predetermined post-processing is performed by using information about the given semantic tag "slot=From". In the information-processing device according to the present embodiment, the above-described semantic tag is extracted. The extracted semantic tag is used to determine the mode of displaying the input-template data through the display-mode-determination unit 113.

Figure 12:
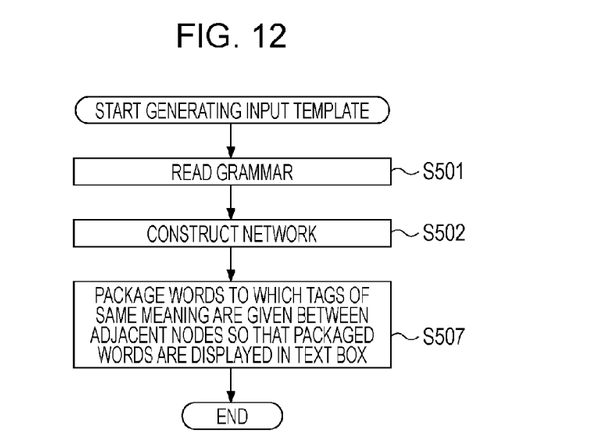
FIG. 12 is a flowchart illustrating input-template-generation processing performed by the information-processing device according to the third embodiment.

FIG. 12 is a flowchart illustrating processing steps performed to generate the input-template data in the information-processing device according to the present embodiment. The same processing steps as those described in the first and second embodiments are designated by the same reference numerals.

Figure 13:
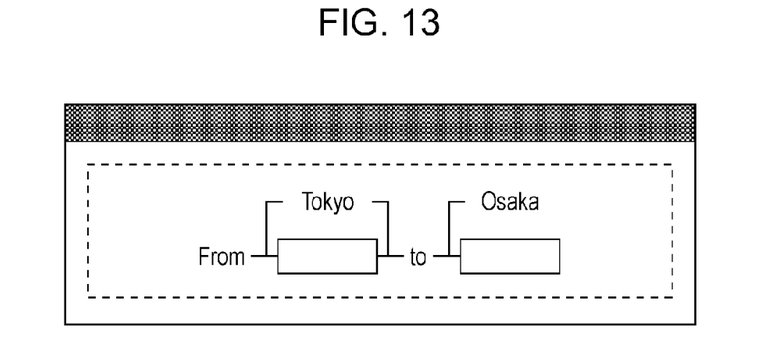
FIG. 13 shows an example UI displayed by the information-processing device according to the third embodiment.

In step S507, the display-mode-determination unit 113 packages word-data items shown between adjacent nodes, that is, word-data items shown in the same section, where the word-data items are provided with tags of the same meaning, and determines the display mode so that the word-data items are displayed in the text box. According to the speech-recognition-grammar data 1100, of the departure city names, each of the city names except Tokyo is displayed in the text box. Likewise, of the destination city names, each of the city names except Osaka is displayed in the text box. FIG. 13 shows an example input-template data generated by performing the above-described processing steps. The information-processing device of the present embodiment can generate the input-template data by using the semantic tags. By giving the semantic tags to the speech-recognition-grammar data, the input-template data for display can be controlled, and a UI for display can be easily customized based on the speech-recognition-grammar data.

Figure 14:
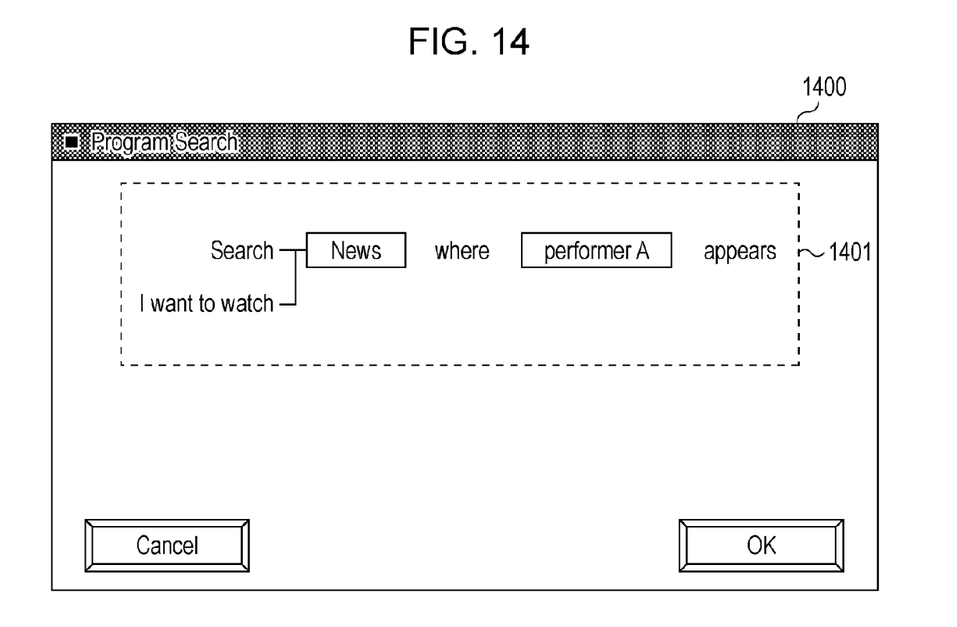
FIG. 14 shows an example UI displayed by the information-processing device according to the fourth embodiment of the present invention.

In the input-template data displayed by the information-processing devices according to the first to third embodiments, each of the displayed text boxes is left blank. When the text box is left blank, it is sometimes difficult for a user to know what types of words can be input to the text box. According to a fourth embodiment of the present invention, a typical word which can be input is displayed in each of the text boxes, for example, as shown in FIG. 14, so that the displayed input-template data is easier for the user to understand.

Hereinafter, the typical word on which data can be input to the text box is denoted as a typical term. A method of determining the typical term at the input-template-generation time will now be described.

When the display-mode-determination unit 113 determines the display mode, the typical term is selected for each of the text boxes. In the first and second embodiments, the display-mode-determination unit 113 selects the typical term when the processing corresponding to step S504 is performed. In the third embodiment, the display-mode-determination unit 113 selects the typical term when the processing corresponding to step S507 is performed.

In the third embodiment, of word-data items that can be input to the text box, the first word written in the speech-recognition-grammar data is selected. However, any of word-data items that can be input to the text box may be selected as the typical term. For example, according to the text box 202 of the input-template data 201 described in the first embodiment, the term "performer A" is determined to be the typical term, where the term "performer A" comes in first of all of performers shown in the region 401 of the speech-recognition-grammar data 400.

Likewise, the typical term of the text box 203 to which category data can be input is the term "News". When the input-template data is stored in the input-template-storage unit 107, at step S303, data on the typical term selected by the display-mode-determination unit 11 is also stored in the input-template-storage unit 107. When displaying the input-template data, the control unit 100 reads the typical-term data stored in the input-template-storage unit 107, and performs display control so that the typical-term data is displayed in the text box. Input-template data 1401 of display image 1400, as shown in FIG. 14, is an example where the typical-word data is displayed in the above-described manner.

The typical-term data may be selected from among data on the input history of the user. In that case, when the user inputs the search-condition data, at step S305, the control unit 100 stores the data on the user's input history in the storage unit 105. The input-history data is stored on a text-box basis. When the control unit 100 displays the input-template data, at step S304, the input-history data is read from the storage unit 105, and a typical term displayed in each of the corresponding text boxes is selected. At that time, the control unit 100 selects the typical term with reference to a last input word, a word which is input with a high frequency, etc. When the input-history data is not stored in the storage unit 105, the typical-term data stored in the input-template-storage unit 107 is displayed.

In the present embodiment, the mode of displaying the typical-term data may be changed to be different from that of displaying word data input by the user by changing the font, color, decoration, and size of characters. Subsequently, it becomes possible to discriminate between the typical-term data selected by the information-processing device and the word data input by the user.

The above-described features of the present invention can be achieved by supplying a storage medium storing program code of software for implementing the functions of the above-described embodiments to a system and/or an apparatus so that a computer (a central-processing unit (CPU) and/or a microprocessing unit (MPU)) of the system and/or the apparatus reads and executes the program code stored in the storage medium.

In that case, the program code itself, read from the storage medium, achieves the functions of the above-described embodiments, and thus the storage medium storing the program code constitutes the present invention.

The storage medium for providing the program code may be, for example, a floppy disk, a hard disk, an optical disk, a magneto-optical disk, a compact disk (CD)-read only memory (ROM), a CD-recordable (R), a magnetic tape, a nonvolatile memory card, a ROM, etc.

Furthermore, not only by the computer reading and executing the program code, but also by the computer executing part of or the entire process utilizing an OS, etc. running on the computer based on instructions of the program code, the functions of the above-described embodiments may be achieved.

In another embodiment of the present invention, the program code read from the storage medium may be written into a memory of a function expansion board inserted in the computer or a function expansion unit connected to the computer. Further, the functions of the above-described embodiments can also be realized by executing part of or the entire process based on instructions of the program code through a CPU or the like of the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-039339 filed on Feb. 20, 2007, which is hereby incorporated by reference herein in its entirety.

What is claimed is:

1. An information-processing device comprising:
   an analysis unit configured to analyze speech-recognition-grammar data;
   a generation unit configured to generate data on a template used to input speech data based on a result of the analysis by the analysis unit; and
   a display-control unit configured to display speech-input-template data generated by the generation unit,
   wherein the analysis unit includes a first acquisition unit configured to acquire data on number N of at least one word shown in at least one section of the speech-recognition-grammar data, wherein each of the sections share previous and subsequent connections, and
   wherein the generation unit determines a mode of displaying the at least one section based on word-number-N data acquired by the first acquisition unit.

2. The information-processing device according to claim 1, further comprising a grammar-acquisition unit configured to acquire the speech-recognition-grammar data from an external device.

3. The information-processing device according to claim 1, wherein the generation unit determines a mode of displaying a section where a value of the word-number-N data is greater than or equal to a threshold value, so that the section is displayed as an input field to which a user can input data.

4. The information-processing device according to claim 3, further comprising a display-area-acquisition unit configured to acquire data on a size of a display area where the speech-input-template data can be displayed,
   wherein the generation unit determines the threshold value based on an acquired display-area-size data.

5. The information-processing device according to claim 3, wherein the display-control unit displays at least one word-data item that can be input to the input field when the input field is displayed.

6. The information-processing device according to claim 5, wherein the word-data item displayed by the display-control unit is a first word-data item written in an analyzed speech-recognition-grammar data of the at least one word-data item that can be input to the input field.

7. The information-processing device according to claim 5, further comprising a history-storage unit configured to store data on an input history of a user,
   wherein a word-data item displayed by the display-control unit is either a last word-data item input to the input field by the user or a word-data item input to the input field with a highest frequency.

8. A method for processing information, the method comprising:

analyzing speech-recognition-grammar data;

generating data on a template used to input speech data based on a result of analyzing the speech-recognition-grammar data; and displaying a generated speech-input-template data, wherein the analyzing of speech-recognition grammar data includes first acquiring data on number N of at least one word shown in at least one section of the speech-recognition-grammar data, wherein each of the sections share previous and subsequent connections; and wherein a mode of displaying the at least one section based on word-number-N data is determined during the step to generate data on the template.

9. A non-transitory computer-readable storage medium storing computer-executable process steps, the computer-executable process steps causing a computer to execute the method of claim 8.

* * * * *